Oct. 22, 1968  E. O. SCHULZ  3,407,053
PROCESS FOR MANUFACTURING GLASS IN FINE GRANULAR FORM
Filed April 21, 1965
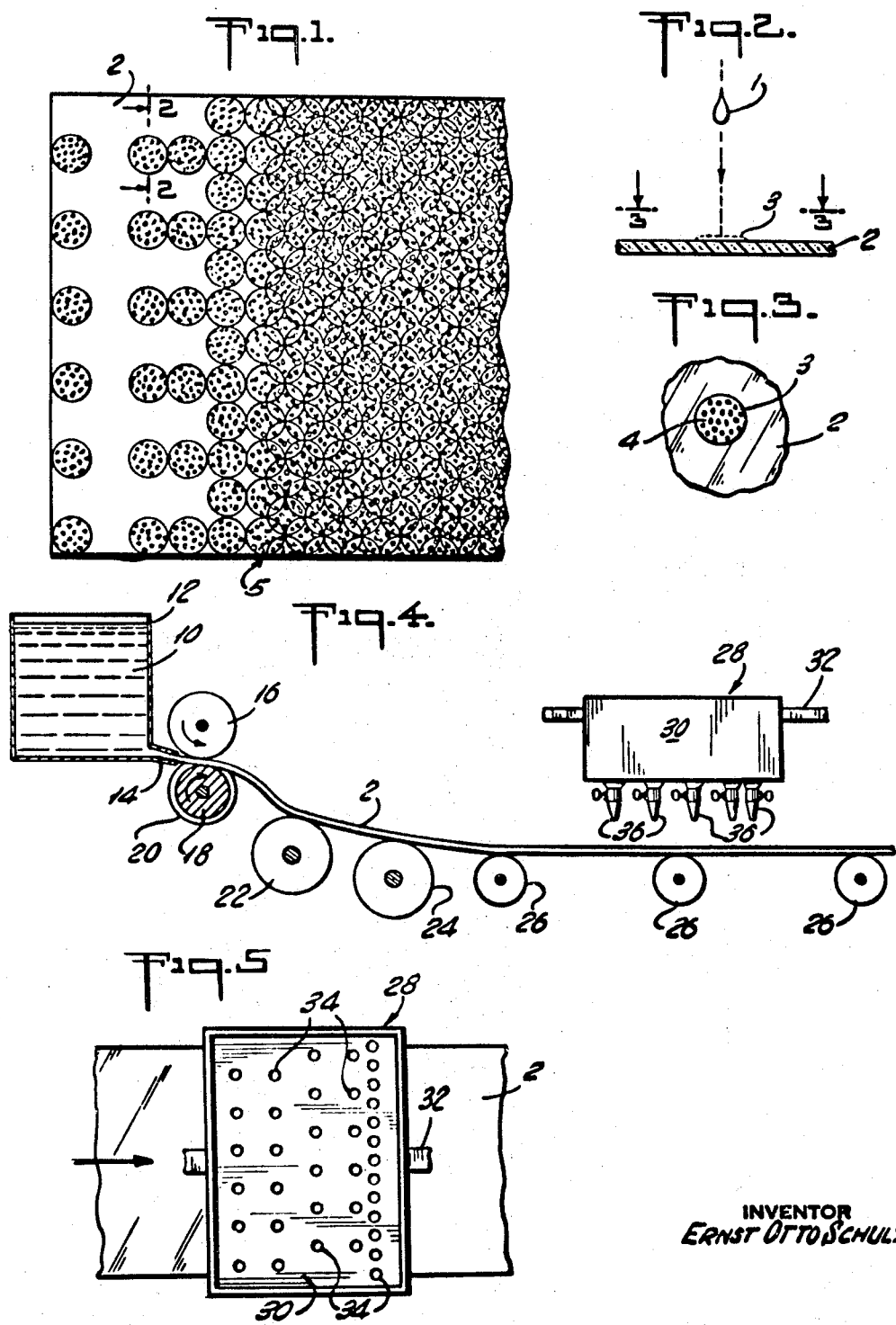
INVENTOR
ERNST OTTO SCHULZ

United States Patent Office 3,407,053
Patented Oct. 22, 1968

3,407,053
PROCESS FOR MANUFACTURING GLASS
IN FINE GRANULAR FORM
Ernst Otto Schulz, Neuhaus am Rennweg, Germany, assignor to VEB Schaumglaswerk Taubenbach, Neuhaus am Rennweg, Germany
Filed Apr. 21, 1965, Ser. No. 449,853
6 Claims. (Cl. 65—21)

ABSTRACT OF THE DISCLOSURE

A process and apparatus for manufacturing glass in fine granular form. The glass is brought to its transformation temperature at which water droplets spread thereon to form a film which suddenly vaporizes to leave at the area previously occupied by the liquid film a dense network of capillary cracks. A glass sheet approximately at this transformation temperature and a field of liquid droplets are moved one relative to the other to cover the sheet at one face with the liquid droplets in a gap-free manner so that the glass sheet is formed with the fine cracks over an entire area of one face of the glass sheet. Then the glass sheet is cooled so that the depth of the cracks increases until the glass sheet is unstable and falls apart in granular form. The apparatus transports the glass sheet with substantially no friction with respect thereto while the droplets are derived from sources of the apparatus which can be separately adjusted to control the size of the droplets and the frequency with which they fall.

---

The present invention relates to a process for manufacturing glass in fine granular form.

Glass in such fine granular form is particularly useful for further treatment where a large surface of the glass is required, and such glass may be used in the manufacture of foam glass as well as sintered glass.

Granular glass can be manufactured with machines such as roller mills, and the glass particles which are to be used for purposes such as the manufacture of foam glass or sintered glass must be free of any dampness and of iron. Processes are known where relatively large glass bodies are broken up into fine granular form with the use of crushing machines in the form of jaw crushers or roller crushers. However, such machines are not suitable to provide granular glass for the above purposes inasmuch as the glass becomes very impure due to frictional rubbing against the steel crushing elements which contaminate the glass with small steel particles, and in addition there is with this process the great disadvantage of providing extremely rapid wear on the crushing structure.

There is also a known process according to which a stream of liquid glass at relatively high temperature is directed into cold water, and in this way the solidifying glass stream becomes converted into a system of glass bodies in the water. However, in this process where the cold water must be continuously replaced, the glass bodies do not have a uniform size and must be separated in damp condition from the water, so that the further step of drying of the glass bodies is required. This subsequent drying makes the granular glass obtained in this way very difficult to use further, inasmuch as the glass bodies have a surprisingly large number of capillary cracks into which the water is sucked.

The water which is situated in these cracks is only partially extracted as a result of the drying, and the granular glass bodies are hydrolytically influenced by the liquid which remains in these cracks during standing of the glass bodies. There is with this latter type of process and apparatus the further disadvantage of subjecting the structure which transports the bodies from the water to an extremely large amount of wear. A further great disadvantage of this latter type of process resides in the fact that the particles of glass form themselves in an uncontrollable manner into substantially spherical bodies, and as a result of the sudden cooling of these bodies in the cold water the substantially spherical glass bodies become hardened and cannot be further reduced in size.

There is also a known process according to which a molten stream of glass is guided through strongly cooled steel rollers so as to be rolled into a thin band. At the moment when this thin band hardens, it springs apart into bodies which are subsequently further reduced in size. Although with this process some of the above-discussed disadvantages of the other processes are avoided, such as the above disadvantgaes of the process where a glass stream is introduced into a body of cold water, nevertheless the structure of the thin glass band is such that during standing of this glass band it assumes a non-planar configuration and as a result provides great difficulties during the further handling of the glass band.

Furthermore, with the exception of highly fluid enamels, there are also great difficulties encountered in handling technical glasses, even though the instant of quenching, hardening, and falling apart into smaller glass bodies as a result of thermal stresses occurs practically simultaneously. In addition, the requirement of a highly fluid glass, which is necessarily at a very high temperature, causes the glass to sharply attack the structure which transports the glass, such as troughs and valves through which the molten glass flows. In order to roll the glass, there is also a requirement of a very high roller pressure with the corresponding requirements of a very high expendiure energy.

It is also known to heat a cold glass band up to its softening point and then to draw it into a thinner band which can then be reduced to smaller glass bodies with a mechanical structure. However, in this case the breaking up of the glass structure in a fully rigid condition is brought about through a purely mechanical action, which is of course highly undesirable. Moreover, because of the multiple steps required by this process its output is quite low.

Of more universal utility are those processes where safety glass is manufactured by heating glass sheets and placing them in a stressed condition with suitable devices while directing streams of air onto the sheets, these glass sheets however, in this stressed condition, being incapable of falling apart into small glass bodies without exterior mechanical action. While it might be theoretically possible to extend the stressed condition of such glass sheets to the point where automatic falling apart of the glass sheets into small glass bodies might occur, the use of such processes for the manufacture of fine granular glass is excluded for economic reasons.

It is also known to manufacture granular glass from cracked glass. In this case a preformed and heated glass band, as long as it still glows a dark red, is very quickly immersed in water or sprayed with water. As a result the surface of the glass becomes covered with a network of cracks. Immediately thereafter the glass band is heated again up to its softening point and is then slowly cooled. However, the breaking up of the glass into individual glass bodies is not achieved in this way. This process is only provided for the purpose of achieving a decorative appearance of the glass surface.

Thus, with this later process it is extremely important that the cracks extend to the smallest possible extent into the body of the glass sheet from the exterior surfaces thereof. Moreover, in this case also the thorough and complete removal of the water during the further heating of the glass is not assured.

A primary object of the present invention is to provide a process and apparatus which will produce fine granular glass without requiring the use of mechanical structures for reducing the size of glass bodies. In other words, with the process and apparatus of the invention the use of crushers or any other type of mechanical structure for mechanically breaking glass bodies is avoided.

A further object of the present invention is to provide a process and apparatus which makes it possible to produce fine granular glass bodies in a completely dry and pure state where the bodies are free of such foreign components as particles of iron or the like.

In addition, it is an object of the present invention to provide a process and apparatus which will be capable of continuously manufacturing the glass bodies.

More specifically, the objects of the present invention include a process and apparatus capable of achieving fine granular glass from the application to glass sheets or bands which are at an elevated temperature of a cooling medium, which is preferably a liquid.

In general, the process of the invention includes the step of providing relative movement between a field of falling liquid droplets and a glass sheet which is at a transformation temperature, approximately, at which a droplet falling on the glass sheet spreads out into an approximately circular film which evaporates from the sheet to leave the surface thereof provided with a network of fine cracks occupying the area formerly occupied by the circular film of liquid prior to evaporation of the latter, and the rate of the above relative movement together with the size of the droplets and the frequency at which they fall are correlated in such a way that the surface of the glass sheet will be covered with these cracks which during the subsequent cooling of the glass sheet increase in depth until the glass sheet is in a condition where it can fall apart into fine granular form.

The apparatus of the invention includes a transporting means which will transport a glass sheet along a predetermined path, and arranged over this path there is provided, in accordance with the invention, a means for providing a field of droplets which fall onto the glass sheet during the movement thereof along the latter path, this latter means being adjustable so that the size and frequency of falling of the droplets can be regulated.

The invention is illustrated by way of example in the accompanying drawings which form part of the application and in which:

FIG. 1 is a fragmentary top plan view of a glass sheet during the treatment thereof by the process and apparatus of the invention;

FIG. 2 is a fragmentary longitudinal section taken along line 2—2 of FIG. 1 and showing how a surface of the glass sheet has a liquid film applied thereto;

FIG. 3 is a fragmentary top plan view of the structure of FIG. 2 taken along line 3—3 of FIG. 2 in the direction of the arrows and showing the manner in which fine cracks are provided on the glass sheet;

FIG. 4 is a schematic side elevation of one possible apparatus according to the present invention for carrying out the process of the present invention; and FIG. 5 is a fragmentary top plan view of the structure of FIG. 4 showing the arrangement of valves for achieving a predetermined field of falling liquid droplets.

The present invention makes use of the observation that a flat glass sheet which is approximately at its transformation temperature will not react with water droplets in the well known manner according to which the water droplets will automatically assume a more or less spherical configuration while dancing on the heated surface and insulated therefrom by a layer of steam which retards the speed at which the water can vaporize inasmuch as the steam is a poor conductor of heat. Thus, for example, if the glass is at such a high temperature that it glows, water droplets will form themselves into substantially spherical bodies when dropping onto such a glass sheet and will be insulated therefrom by a layer of steam which retards the vaporizing of the droplets while they continue to dance on the sheet. At the lower transformation temperature, which in the case of conventional window glass is approximately 540° C., the water droplets will not behave in this latter manner.

Instead, at this transformation temperature of the glass a water droplet falling onto the latter will spread out on the surface of the glass and will form a film thereon. While water and glass are mentioned, this same behavior can be achieved with other liquids and other heated materials, although the liquid should behave in the same way as water with respect to its viscosity, in order to achieve this result. The behavior of the liquid droplets falling onto the sheet is similar to the behavior of a film of oil which spreads out on waves so as to reduce the turbulence thereof.

The above-described behavior of liquid droplets on a flat glass sheet which is approximately at its transformation temperature has been observed to provide for an individual droplet a substantially circular film of relatively large area on the glass sheet, so that each droplet spreads itself out substantially into the form of a thin lamination of water resting on the surface of the glass sheet, and in this latter condition the liquid very suddenly vaporizes leaving at the area previously occupied by the thin circular film of liquid a correspondingly large spot which appears opaque. This spot which has the same size and configuration as the substantially circular film of liquid which suddenly evaporates from the sheet is initially composed of a very fine and quite dense network of cracks of capillary size which are distributed horizontally on the surface of the glass sheet and this network of fine cracks remains only within the substantially circular area previously covered by the thin film of liquid, so that there is no tendency to produce cracks in the region of the glass sheet which adjoins that where the substantially circular film of liquid was previously located.

It has furthermore been observed that the above behavior can be repeated throughout the upper surface of a substantially horizontal glass sheet by distributing the water droplets over this surface in such a way that it will cause each increment of the area of the surface to be engaged at least once by the thin film of liquid which immediately evaporates to leave the network of fine cracks, so that in this way it is possible to provide a glass sheet which is covered over its entire surface area, at its upper face, with a relatively dense fine network of cracks.

Referring to FIG. 1, there is shown therein a glass band or sheet 2 which may be continuously formed and which has cooled, during its transportation, down to the transformation temperature. This glass sheet 2 may be transported on suitable rollers and in accordance with the invention it passes beneath a structure which deposits a field of water droplets at a predetermined frequency onto the glass sheet which is at the transformation temperature when it is contacted by the water droplets.

The glass band or sheet continuously cools as it solidifies from its molten condition and as it progresses along the rollers, so that it will cool to the transformation temperature at which the water droplets will behave in the above-described manner, this transformation temperature being well known to those skilled in the art and it is possible to determine the transformation temperature in a known way.

Thus, the glass sheet moves continuously in the direction of the arrow shown in FIG. 5 beneath a means which will deposit liquid droplets onto the glass sheet. When the glass sheet moves beyond the means for providing the field of liquid droplets, the glass sheet will be in a condition where it will simply automatically fall apart into fine granular form, although, if desired, the glass sheet may be fed into an installation of known structure which vibrates the sheet slightly so as to promote the breaking up of the glass sheet into fine granular form, and once it is in this latter form it is perfectly pure and dry and can be further transported to areas where further treatment of the glass sheet will take place.

With the process and apparatus of the invention, the means for depositing liquid droplets, which may be water, will drop a predetermined field of droplets at a given frequency with the droplets having a predetermined size, and the droplets may fall through a distance of approximately 1 meter, for example, before reaching the surface of the glass band or sheet. The arrangement of the sources of the droplets is so chosen that the droplets reach the glass band in groups as indicated in FIG. 1. Thus, as may be seen from the upper portion of FIG. 1, as the glass band moves beneath the means for providing the field of droplets, there will initially be separate rows of droplets which spread out to form the substantially circular films indicated in the dotted circles of FIG. 1, and as the sheet progresses beneath the means for providing the field of droplets, the droplets become deposited in the free areas between the previously deposited droplets, so that by the time the row 5 of droplets shown in FIG. 1 has been deposited the entire area of the glass sheet has been covered at least instantaneously with the liquid film which upon almost immediate vaporization leaves the fine cracks in the surface of the glass. By regulating the frequency with which the droplets fall and their size as well as by regulating the speed of movement of the glass band, it is possible to achieve the pattern shown in FIG. 1 where complete coverage of the surface of the glass band is assured.

With the process and apparatus of the invention use is made of the above-described behavior of the droplets when they encounter a glass sheet which is substantially at the above-discussed transformation temperature, as well as of a predetermined pattern of droplets in a given field with a structure for individually adjusting each droplet source so as to control the frequency and size of the droplets, and also of course the speed of movement of the glass can be controlled. In this way a dense network of fine capillary cracks will be produced on the upper surface of the glass sheet.

Because of the temperature differential between the upper surface of the glass sheet and the lower surface thereof, the cracks which are initially situated in the immediate vicinity of the upper surface of the glass sheet increase in depth and rapidly progress into the body of the glass sheet toward the lower surface thereof, so that in a relatively short time the glass sheet loses its coherence and becomes mechanically unstable, providing a liquid-free mosaic of tiny glass bodies which simply burst apart from each other either automatically or, with some glasses, with the use of a slight vibration of the glass sheet. Of course, it is immaterial whether the process of the invention is applied to a glass sheet during the manufacture thereof from a molten mass of glass, or whether an individual cold sheet of glass at room temperature is initially heated up to the region of the transformation temperature before being subjected to the process of the invention. Of course, if the invention is used during the manufacture of the glass sheet, heating thereof is not required.

The size of the individual bodies of glass achieved with the invention is determined in accordance with the particular type of glass, the thickness of the glass sheet, the frequency with which the droplets are deposited on the glass, the size of the droplets, the distance between the droplets, and the distance that the droplets fall.

By controlling these latter factors it is possible to achieve a fine granular glass of desired properties.

The manner in which the relative movement between the glass sheet and the field of droplets provides for each droplet an individual film 3 of liquid on the upper surface of the glass sheet 2 is particularly apparent from FIG. 2 which shows a droplet 1 falling and spreading out to the circular area 3 on the upper surface of the glass sheet, as indicated in FIG. 2. This thin film of liquid 3 which is of substantially circular configuration and which has a diameter several times greater than the largest cross sectional thickness of the water droplet 1 quickly evaporates from the surface of the glass sheet leaving thereon the dense field of fine cracks 4 as indicated in FIG. 3, and this is what is achieved from each individual droplet with the process and apparatus of the invention. Thus, the capillary cracks will completely cover the surface of the sheet in a uniform manner, because of the uniform application of the liquid droplets to the sheet, as is apparent from the lower part of FIG. 1, and as the sheet progresses beyond the means for providing the droplets the temperature differential between the upper and lower surfaces of the sheet will increase the depth of the cracks providing automatically a breakdown of the coherence of the glass sheet so that it assumes the condition of a dry, opaque mosaic of tiny bodies which are only loosely attached to each other so that finally they spontaneously fall apart from each other or are separated by the use of a precise mechanical vibration mechanism.

As may be seen from FIG. 4, according to the one process and apparatus of the present invention the molten glass 10 is in a suitable container 12 provided with an outlet 14 which feeds a ribbon of molten glass into the space between a pair of rollers 16 and 18, the roller 18 having at its ends the outwardly directed flanges 20 which limit the width of the band 2 which continuously issues from the space between the rollers 16 and 18. These rollers are driven so as to turn in the directions indicated by the arrows in FIG. 4, and the drive of these rollers is adjustable so that the rate at which the band 2 moves can be regulated. The band 2 continuously issues from between the rollers 16 and 18 onto a lower roller 22 from where the band moves to a roller 24 and then to a further series of rollers 26, and these rollers 22, 24 and 26 need not be driven but can be supported for free rotation so as to turn only in response to movement of the glass sheet over the tops of the rollers. By the time the glass sheet reaches the rollers 26, all of which have their axes situated in a common horizontal plane, the sheet will be at the transformation temperature, and now the sheet moves beneath the means 28 which provides the field of droplets referred to above. This means 28 takes the form of a tank 30 which may be provided with a supply of water from any suitable source and which is held up over the path of movement of the glass sheet by any suitable framework 32. The lower wall of the tank 30 is formed with a series of openings 34 having the pattern shown most clearly in FIG. 5, and it is apparent that with this pattern of openings it is possible to achieve a field of droplets which will produce the results described above in connection with FIGS. 1–3. To the several openings 34 are respectively connected a plurality of simple pet cocks 36 which are individually adjustable, so that in this way each individual source 36 for a series of droplets which fall one after the other along a single vertical line can be individually adjusted, and thus each vertical line of falling droplets can have the frequency of the droplets and the size thereof individually regulated and adapted to the speed of movement of the glass sheet to provide the results described above in connection with FIG. 1. Of course, a further adjustment can be achieved by controlling the speed of rotation of the rollers 16, 18, so as to regulate the speed of movement of the glass band itself.

The molten glass in the tank 12 can be at a temperature of between 1100 and 1300° C., and the band 2 can have a width of 50 cm. and a thickness of approximately 4 cm., and the glass can have the composition of conventional window glass. The glass band 2 moves in a downwardly inclined direction from the space between the rollers 16 and 18 onto the subsequent rollers 22 and 24, with the glass moving additionally at a downward elevation, until it reaches the rollers 26 which maintain the glass in a horizontal plane while continuing the transportation thereof. The distance through which the glass is moved as it advances beneath the means 28 may be on the order of 2.5 meters.

In accordance with the thickness of the band the cocks 36 may be situated at an elevation of from 0.80 to 1.5 meters above the upper surface of the glass band. As is apparent particularly from FIG. 5, the initial rows of openings 34, shown at the left of FIG. 5, which in the actual example may be provided with twelve openings 34 in each row, are arranged so that the openings of the third and fourth rows from the left of the tank 30 in FIG. 5 are staggered with respect to the first and second rows starting from the left in FIG. 5, and of course all these rows of openings are parallel to each other, so that the cocks 36 also form similar parallel rows, and there is the final row of openings 34 shown at the right in FIG. 5 which completely fills the spaces between the areas covered by the droplets of the preceding rows, as is apparent from the row 5 shown in FIG. 1.

Of course, the above-described structure is only an example of one of many different types of structures which may be used to practice the process of the invention. Also, the manner in which the glass band is transported can take many different forms and the glass instead of being treated during its manufacture can be glass at room temperature which is heated to the transformation temperature. Moreover, the particular composition of the glass is immaterial as long as the drops contact the glass at the transformation interval of the particular glass composition.

Of course, if the speed of movement of the glass band is increased, then the frequency with which the droplets fall should be increased.

In one specific process which has been carried out, the glass band was moved at a speed of 2 meters per minute which the frequency with which the droplets fell was for each vertical path of a series of droplets between 0.8 and 1.1 droplets per second. However, with different band speeds other droplet frequencies would be used, as long as the results of FIG. 1 are achieved. As was pointed out above, with conventional window glass the transformation temperature is approximately 540° C. which more specifically represents a beginning of the transformation interval.

With this latter particular example no vibratory structure is required and the glass automatically falls apart into fine granular form, the glass grains being received in a suitable container from which the granular glass is transported to devices which further treat the glass.

What is claimed is:

1. A process for manufacturing glass in fine granular form, comprising the steps of thermally influencing a glass sheet until it is approximately at a transformation temperature at which liquid droplets falling on the sheet each spread out on the sheet to form a substantially circular liquid film which evaporates from the sheet at said transformation temperature to leave a fine network of cracks in the sheet, moving the glass sheet and a field of falling liquid droplets one with respect to the other at a predetermined speed while the glass sheet is at said transformation temperature with said droplets falling onto said sheet, and dropping said droplets onto said sheet at a frequency and size which at said predetermined speed of movement cover in a gap-free manner one face of said glass sheet with the liquid film derived from said droplets, and cooling the glass sheet to increase the depth of the cracks until the glass sheet has a condition where it can fall apart into glass in fine granular form.

2. A process as recited in claim 1 and wherein the sources from which the droplets are derived are independently regulated to control the frequency of the droplets and the size thereof.

3. A process as recited in claim 2 and wherein the regulation of any one source of the droplets is independent of the regulation of the remainder of said sources.

4. A process for manufacturing glass in fine granular form, comprising the steps of converting a body of molten glass into a sheet of glass while cooling the glass approximately to a predetermined transformation temperature, moving the sheet of glass and a field of liquid droplets one relative to the other while dropping the droplets onto one face of the sheet and covering said one face without interruption when the glass sheet has cooled substantially to said predetermined transformation temperature at which each droplet when contacting said face of said sheet will spread out thereon to form a substantially circular film, which evaporates from the glass sheet leaving a network of fine cracks at the area previously covered by the film, and continuing the cooling of said glass sheet to increase the depth of the cracks until the sheet has a condition where it can fall apart into glass of fine granular form.

5. A process for manufacturing glass in fine granular form, comprising the steps of heating a glass sheet from room temperature up to a transformation temperature at which a droplet of liquid contacting the sheet will spread out thereon into the form of a circular liquid film which upon evaporating from the sheet will leave a network of fine cracks thereon, moving the sheet when the latter is substantially at said transformation temperature and a field of liquid droplets one relative to the other while entirely covering one face of the sheet with said film which evaporates from the sheet to leave a network of fine cracks therein, and then cooling said sheet to increase the depth of the fine cracks until the sheet has a condition where it can fall apart into glass of fine granular form.

6. A process for manufacturing glass in fine granular form, comprising the steps of thermally influencing a sheet of conventional window glass until it is substantially at a temperature of 540° C., moving the glass and a field of water droplets one with respect to the other at a predetermined speed while directing the droplets onto the sheet at a frequency and size which at said speed will completely cover one face of the sheet with the liquid, and then cooling the sheet until it assumes an unstable condition where it can be converted into fine granular form.

References Cited

UNITED STATES PATENTS

| 1,675,951 | 7/1928 | Middendorf | 65—70 |
| 3,215,345 | 11/1965 | Ferguson | 225—93.5 |
| 1,865,376 | 6/1932 | Gorsuch | 55—21 |

DONALL H. SYLVESTER, *Primary Examiner.*

ARTHUR D. KELLOGG, *Assistant Examiner.*